(12) United States Patent
Amstutz et al.

(10) Patent No.: US 6,481,580 B1
(45) Date of Patent: Nov. 19, 2002

(54) FLUID FILTER WITH LOCKING MECHANISM

(75) Inventors: Aaron K. Amstutz, Champaign, IL (US); David C. Becktel, Washington, IL (US); Jeffrey R. Ries, Metamora, IL (US); Kevin K. Socha, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/644,379

(22) Filed: Aug. 23, 2000

(51) Int. Cl.⁷ ............................................... B01D 35/34
(52) U.S. Cl. .................... 210/440; 210/442; 210/457
(58) Field of Search ............................. 210/440, 442, 210/457

(56) References Cited

U.S. PATENT DOCUMENTS

| | | | |
|---|---|---|---|
| 5,762,788 A | * | 6/1998 | Gullett ..................... 210/232 |
| 5,770,054 A | | 6/1998 | Ardes |
| 5,814,215 A | | 9/1998 | Bruss et al. |
| 5,837,137 A | | 11/1998 | Janik |
| 5,846,416 A | | 12/1998 | Gullett |
| 5,868,932 A | * | 2/1999 | Guichaoua et al. ......... 210/440 |
| 5,922,196 A | | 7/1999 | Baumann |

FOREIGN PATENT DOCUMENTS

| | | | |
|---|---|---|---|
| DE | 3416304 | 11/1985 | |
| DE | 19859960 | 7/2000 | |
| FR | 802427 | * 9/1936 | ................. 210/440 |
| GB | 2307422 | 5/1997 | |

\* cited by examiner

*Primary Examiner*—Matthew O. Savage
(74) *Attorney, Agent, or Firm*—K. R Carey; Robert J Hampsch

(57) ABSTRACT

A fuel filter assembly with a replaceable filter element and a reusable filter housing, which incorporates a locking mechanism to ensure that the filter system will not be operated without a filter element installed.

5 Claims, 4 Drawing Sheets

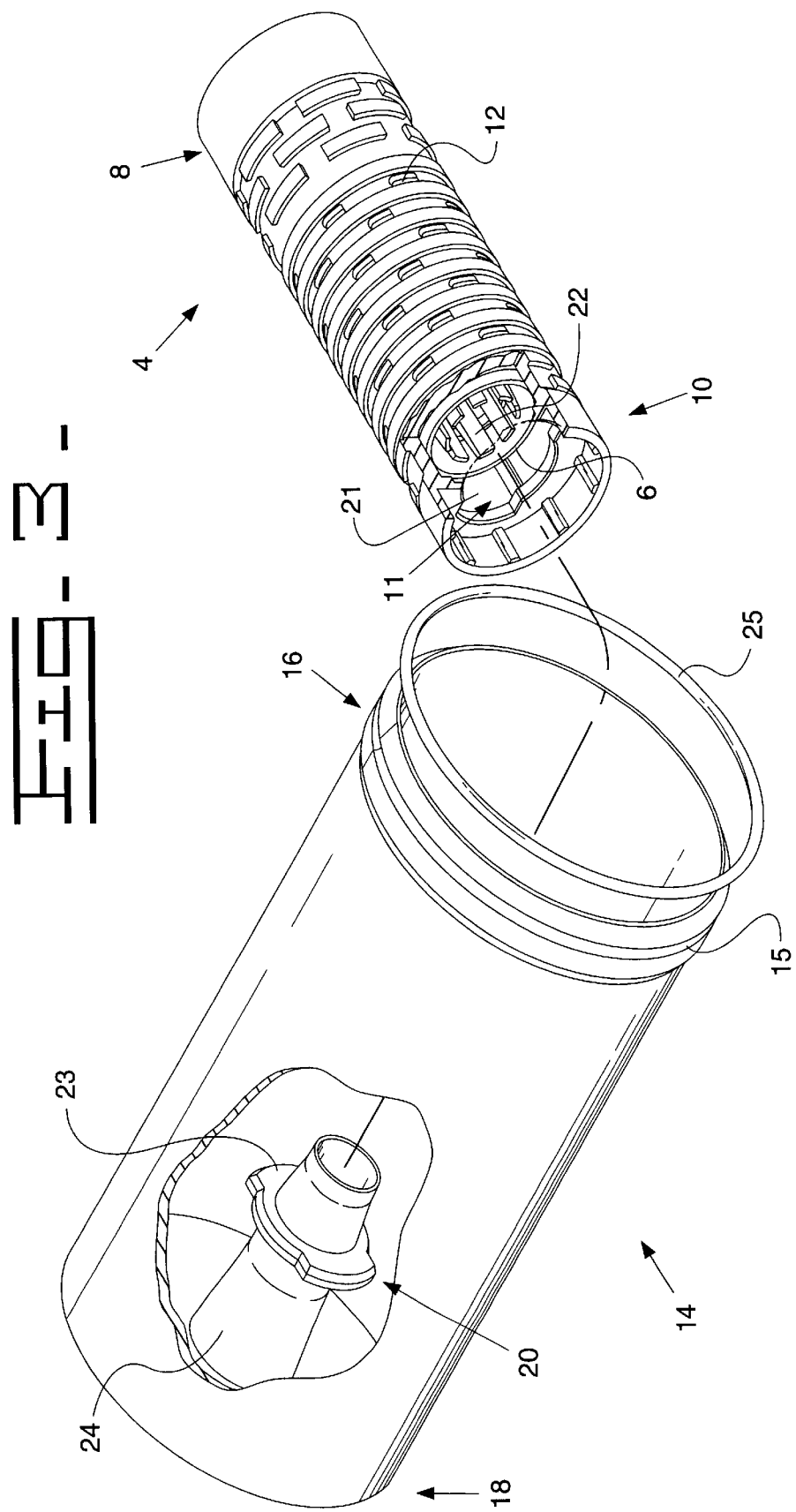

Fig-4-
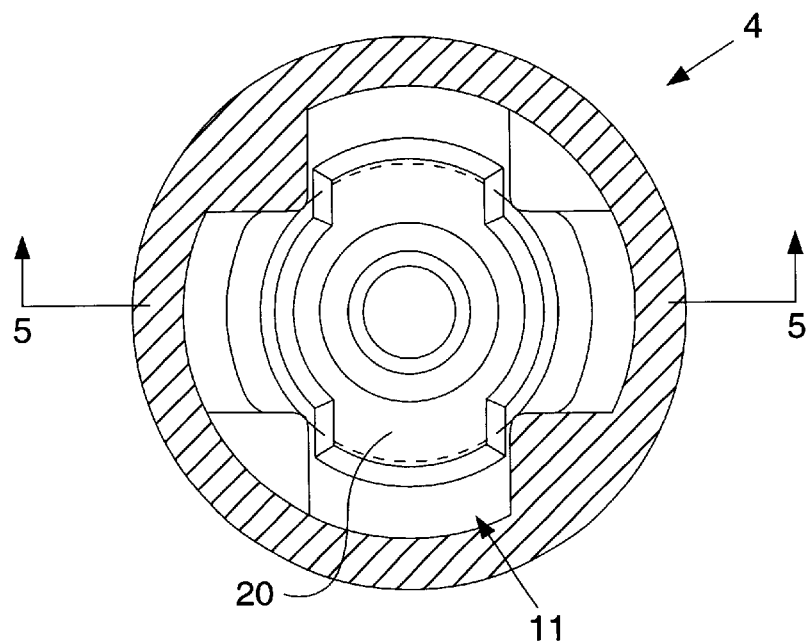
Fig-5-
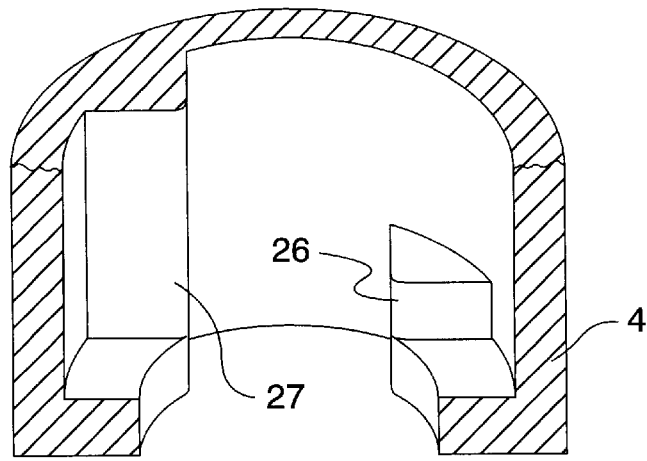

FLUID FILTER WITH LOCKING MECHANISM

TECHNICAL FIELD

The present invention relates generally to fluid filters, and more particularly to a reusable filter assembly with a locking mechanism to affix the replaceable filter element and the reusable filter housing.

BACKGROUND ART

Filter assemblies for filtering liquids such as engine oil, hydraulic oil and fuel are well known in the art. A fuel filter assembly is installed in the engine fuel lines to remove grit and other contaminants from the fuel before it enters a fuel injection system of an engine to increase the service life of the fuel injection components.

Disposable or "throw away" type fluid filters are also known in the art. The disposable fluid filter, however, represents a waste of natural resources, labor and materials.

To solve this problem in the past, a reusable fluid filter assembly having a detachable cover, a filter element, and a housing, having a hollow central core to permit the replacement of the filter element, has been developed and is known in the art. U.S. Pat. No. 5,846,416 issued Dec. 8, 1998, to Caterpillar Inc., discloses such a reusable filter assembly. A typical reusable filter assembly has a filter housing which contains a filter element used for filtering the fuel as it circulates through the housing. The housing ordinarily has a first end adapted for coupling the filter assembly to the engine block of the internal combustion engine by means of an externally threaded housing that threads onto a corresponding internally threaded configuration on the engine block. The housing also has a second end which is ordinarily closed.

A recurring problem with reusable filter units such as the type described above, occurs when the owner of the vehicle and/or the maintenance technician servicing the internal combustion engine removes the filter element for replacement. The owner of the vehicle and/or the maintenance technician may dispose of the used filter element but unknowingly fail to replace the filter element. Since the threaded reusable housing attaches to the engine, it is possible to attach the housing to the engine without a replacement filter installed. Operation of the internal combustion engine without a filter element can jeopardize the integrity of the filtering system, resulting in very serious consequences.

The present invention is directed to overcome one or more problems of the heretofore utilized replaceable filter element and reusable filter housing assemblies.

DISCLOSURE OF THE INVENTION

In accordance with one aspect of the present invention, a replaceable filter element 4 of a fluid filter assembly 2 with a locking mechanism is disclosed. The filter element 4 has a central tube member 6 which attaches to a filter base 5 at the top portion 8, and at the bottom portion 10, a female locking member 11 rotatably couples and axially locks the filter element 4 to a reusable filter housing 14. The filter element 4 also contains filter media 7.

In another aspect of the invention, a fluid filter assembly 2 is disclosed. The fluid filter assembly 2 includes a replaceable filter element 4 and a reusable filter housing 14. The reusable filter housing 14 has an open end 16 and a closed end 18. The closed end 18 has a male member formed within the closed end 18 and adapted for axially coupling and rotatably locking the filter housing 14 and the female locking member 11 of the replaceable filter element 4.

BRIEF DESCRIPTION OF THE DRAWINGS

FIG. 3 is a perspective view of the filter assembly of the present invention;

FIG. 4 is an end view of the of the filter element of the present invention; and FIG. 5 is a cross-sectional view of the female locking mechanism of the present invention.

BEST MODE FOR CARRYING OUT THE INVENTION

Figure 1:
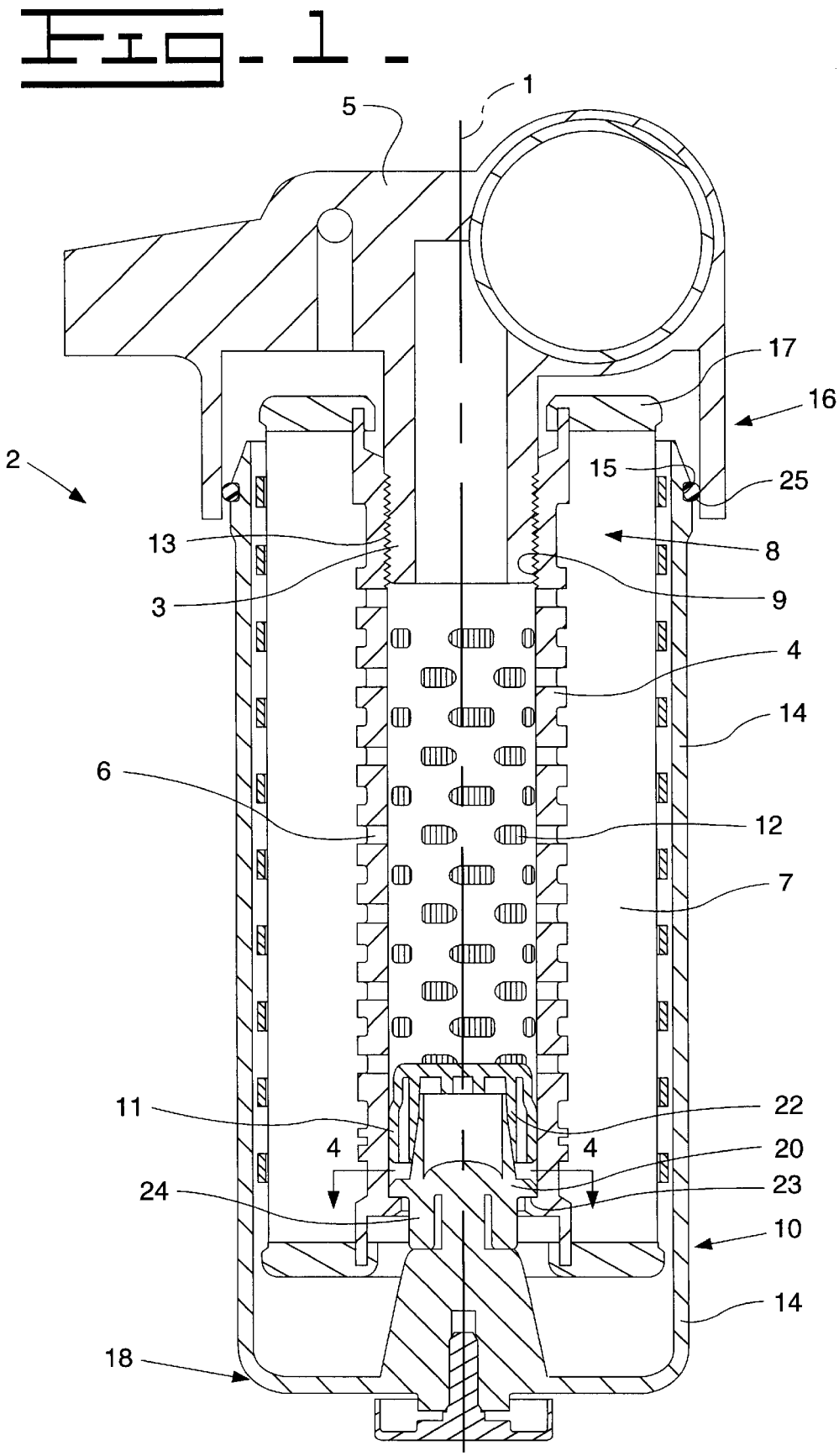
FIG. 1 is a sectional view of a fuel filter assembly in accordance with the invention.

With reference to FIG. 1, a fluid filter assembly 2 in accordance with the present invention is disclosed. The fluid filter assembly 2 comprises a filter base 5, a reusable filter housing 14, and a replaceable filter element 4. The filter base 5 is disposed generally above the replaceable filter element 4 which is attached to the filter base 5.

In the preferred embodiment, the filter element 4 is threaded to the filter base 5 by means of a threaded stud 3 mated with threads of central tube member 9 of a central tube member 6 of the replaceable filter element 4. The fluid filter assembly 2 is especially adapted for use as a fuel filter assembly 2 in the fuel supply system of an internal combustion engine (not illustrated), such as a diesel engine, for removing particulate matter from the fuel and separating the water from the fuel. Filters of this type may also be used to filter impurities from oil in the lubrication system of an internal combustion engine or for other filter applications.

The filter base 5 and the replaceable filter element 4 may assume a wide variety of configurations. For the preferred embodiment, the filter base 5 is an inverted cup-like receptacle.

The replaceable filter element 4 comprises a central tube member 6 with apertures 12 disposed along a longitudinal axis 1. The apertured central tube member 6 has a top portion 8 and a bottom portion 10. The top portion 8 of the apertured central tube member 6 has threads for mating with the threaded stud 3 of the filter base 5. In the preferred embodiment, the central tube member 6 has internal threads for threadably engaging an externally threaded stud 3 of the filter base 5.

The bottom portion 10 of the apertured central tube member 6 provides a female locking member 11. The female locking member 11 is an inverted cup-like receptacle with a recess 21 for receiving a male member 20. The female locking member 11 is adapted for axially coupling and rotatably locking with the male member 20.

Figure 2:
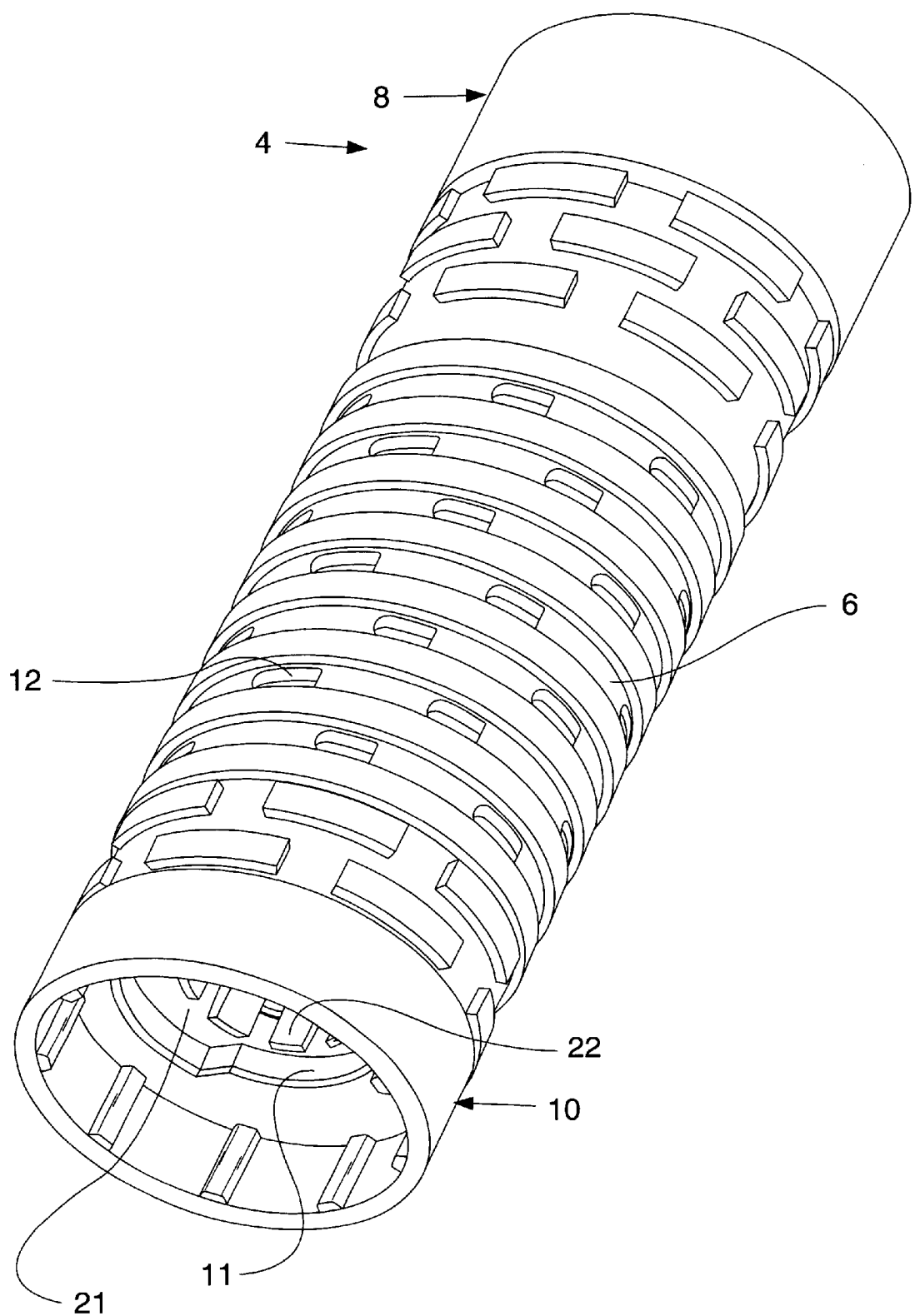
FIG. 2 is an isometric view of the replaceable filter element of the present invention.

As shown in FIG. 2, the central tube member 6 is cylindrical in shape and is constructed from a rigid polymer material.

A reusable filter housing 14 is cylindrical in shape and has an open end 16 and a closed end 18. Preferably, the filter housing 14 is constructed from a rigid polymer material. The open end 16 has an annular sealing groove 15 adapted for sealing the reusable filter housing 14 with the filter base 5.

Turning to FIG. 3, the closed end 18 of the filter housing 14 has a male member 20. The male member 20 comprises a male stem 24 that is cylindrical in shape with flanges of the male locking mechanism 23 at 180 degrees to one another. The male member 20 is adapted for axially coupling and rotatably locking the male member 20 of the filter housing 14 and the female locking member 11 of the filter element 4.

As shown in FIGS. 3, 4, and 5, the male member 20 mates with the corresponding recess 21 in the filter element 4. The male member 20 is inserted into the corresponding recess 21 of the female locking member 11 and is then rotated 90 degrees to lock the filter housing 14 and the filter element 4. There are circumferentially located tangs of the female locking member 22 which provide resistance and prevent the locking mechanism from further rotation once locked into place.

Once the male member 20 and the tangs of the female locking member 22 are vertically coupled, the filter element 4 is axially rotated. The flanges of the male pedestal 23 are able to clear a short stopping mechanism 26 and continue rotation until about 90° where the flanges 23 contact a tall stopping mechanism 27 that lock the filter element 4 and the filter housing 14 in place.

INDUSTRIAL APPLICABILITY

Reusable filter assemblies have been developed to replace disposable filter assemblies in order to decrease waste and money. However, the reusable type assemblies thread the housing into the filter base for installation. A service technician may inadvertently remove the used filter element and fail to replace it prior to reinstalling the filter housing. This can cause debris to accumulate in the fuel system and eventually cause engine damage.

In the present invention, a replaceable filter element 4 and reusable filter housing 14 is disclosed which will not allow installation of the filter assembly 2 without a filter element 4 installed. This is due to two main features. First, the filter element 4 includes a female locking member 11 which rotatably couples and axially locks with a male member 20, which is formed integrally with the filter housing 14. Second, the filter element 4 includes a top portion 8 of the central tube member 6, which attaches to the filter base 5 after the filter element 4 and the filter housing 14 are coupled.

To assemble the filter element 4 and the filter housing 14, the female locking member 11 mates with the flanges of the male pedestal 23 so that the tangs of the female locking member 22 slide over the male member 20 and provide resistance as the two mate. Once the male member 20 and the tangs of the female locking member 22 are vertically coupled, the filter element 4 is rotated 90° until it contacts the tall stopping mechanism 27 that locks the two members in place.

Once coupled, the assembly is installed by attaching the central tube member 6 to the filter base 5. Preferably, the top portion 8 of the central tube member 6 has internal threads 9 which mate with and threadably engage external threads of the stud 13 on the filter base 5.

Although the present invention is described in terms of a preferred embodiment, those skilled in the art will recognize that various means for attaching the filter element 4 to the filter base 5 may be employed without departing from the spirit of the invention.

Other aspects, features, and advantages of the present invention may be obtained from a study of this disclosure and the drawings, along with the appended claims.

What is claimed is:

1. A fluid filter assembly with a locking mechanism, said filter assembly comprising:
    a replaceable filter element having a filter media surrounding an apertured central tube member and disposed along a longitudinal axis, said apertured central tube member having a top portion and a bottom portion, said top portion attaching to a stud of a filter base, said bottom portion having a female locking member formed integrally with said bottom portion; and
    a reusable filter housing having a cylindrical body with an open end, said open end adapted for mating with said filter base, and a closed end, said closed end having a male member having a cylindrical male stem, said cylindrical male stem having flanges (23), said flanges adapted for axial insertion into axial slots defined by a recess of said female locking member followed by rotation and rotational locking with respective stopping mechanisms of said female locking member.

2. A reusable fluid filter assembly of claim 1, wherein said top portion of said central tube member includes threads adapted for threadably engaging said stud, said stud having mating threads.

3. A reusable fluid filter assembly of claim 1, wherein said threads of said central tube member are internal.

4. A reusable fluid filter assembly of claim 1, wherein said central tube member includes apertures.

5. A reusable fluid filter assembly of claim 1, wherein said open end of said filter housing includes an annular seal groove on an outer circumference of said filter housing adapted for receiving a seal, thereby sealing said filter housing and said filter base.

\* \* \* \* \*